United States Patent [19]

Rauch, Sr.

[11] 4,284,664
[45] Aug. 18, 1981

[54] FIBER REINFORCED CERAMICS PRODUCED WITHOUT PRESSING OR SINTERING USING A SLURRY COMPRISING A SILICATE AND A POWDERED CERAMIC

[75] Inventor: Harry W. Rauch, Sr., Chester, Pa.

[73] Assignee: General Electric Company, Philadelphia, Pa.

[21] Appl. No.: 100,283

[22] Filed: Dec. 5, 1979

[51] Int. Cl.³ .................. B05D 1/12; B05D 3/00; B32B 13/02
[52] U.S. Cl. .................. 427/180; 427/397.7; 427/397.8; 427/380; 427/381; 428/241; 428/272; 428/273; 428/281; 428/288; 428/408; 428/902
[58] Field of Search .................. 427/180, 397.7, 397.8, 427/380, 381; 428/241, 272, 273, 281, 288, 408, 902

[56] References Cited

U.S. PATENT DOCUMENTS

| | | | |
|---|---|---|---|
| 3,490,065 | 1/1970 | Shannon et al. | 427/397.7 |
| 3,991,247 | 11/1976 | Theron | 428/241 |
| 4,179,535 | 12/1979 | Kalbskopf et al. | 428/397.8 |

OTHER PUBLICATIONS

Weldes et al., *Industrial and Engineering Chemistry*, vol. 61, Apr. 1969, pp. 29–44.
Sambell et al., *Journal of Materials Science*, 7 (1972), pp. 663–681.
Donald et al., *Journal of Materials Science*, 11 (1976), pp. 949–972.

*Primary Examiner*—James C. Cannon
*Attorney, Agent, or Firm*—Allen E. Amgott; Raymond H. Quist

[57] ABSTRACT

Fiber reinforced ceramics are produced without pressing or sintering by treating the fibrous reinforcement with an aqueous slurry comprising an alkali silicate and a ceramic powder and thereafter drying.

8 Claims, No Drawings

FIBER REINFORCED CERAMICS PRODUCED WITHOUT PRESSING OR SINTERING USING A SLURRY COMPRISING A SILICATE AND A POWDERED CERAMIC

BACKGROUND OF THE INVENTION

This invention relates generally to ceramic materials and more particularly to composite ceramic materials.

Composite materials consisting of a matrix material with reinforcing fibers have been widely used for many purposes. Fiber reinforced plastics are used for panels and bulkheads in aircraft, but are less than ideal for that purpose because they are flamable and in some cases produce toxic gases when burned.

Fiber reinforced ceramics resist high temperatures and do not emit toxic fumes when exposed to such temperatures. Such ceramic composites therefore have desirable properties as substitutes for fiber reinforced plastics. Fabrication of composite ceramics has been rather complex involving such techniques as hot pressing and cold pressing followed by sintering. Some difficulties have been found when the thermal expansions of the two materials do not match.

SUMMARY OF THE INVENTION

A ceramic composite is prepared by applying a slurry of aqueous alkali silicate and a powdered ceramic to a reinforcing medium such as fibers or cloth. The composite is first air dried at room temperature and then heated while being compressed.

DESCRIPTION OF THE PREFERRED EMBODIMENT

The brittle nature of ceramic materials can be overcome to some extent by the addition of a reinforcing material. I have found that the complex prior art processes need not be used to satisfactorily fabricate certain composite ceramics.

Initially a slurry is prepared by combining an aqueous silicate and a ceramic powder. Suitable aqueous silicates are Kasil #1, an aqueous potassium silicate, and N-Sodium silicate, an aqueous sodium silicate. Both are products of PQ Corporation (previously Philadelphia Quartz). A combination of these aqueous silicates may also be used. Suitable ceramics are Cab-o-sil, a very finely divided amorphous silica produced by the Cabot Corporation, fused silica powder and Pyrex glass powder.

Next the slurry is applied by dipping, brushing or spraying to graphite fibers (preferably continuous) or to fused silica cloth or Kevlar cloth. The thickness of the laminate is controlled by the number of fiber bundles or pieces of fabric placed together. It should be noted that some fibers are coated with a sizing which will prevent wetting of the fibers by the slurry. Any such sizing must be removed.

The composite should then be air dried at room temperature or slightly above for twenty four hours while being held between flat plates or in a press.

The air dried composite is then placed in a cold furnace which is heated slowly ($\leq 50°$ C./hour) to 95° C. It is held at this temperature until most of the water has evaporated. This time will vary depending upon the thickness of the laminate, the materials used and the composition. The temperature is next increased to 125° C. at 10° C. per hour and held for four hours. As is known in the art, resistance to moisture or rehydration depends on the maximum temperature of exposure. (Since carbon begins to oxidize at about 550° C. this is the limit where graphite fibers are used.)

Because the viscosity of the slurry can be varied over a wide range it is possible to thoroughly impregnate both loose and tight fiber bundles or fabric weaves. In addition the high maturing temperatures normally associated with ceramic materials are not needed to cure these composites. Depending upon the application, room temperature cure may be sufficient, and at most temperatures approaching several hundred degrees Centigrade would be adequate.

I claim:

1. A ceramic composite prepared without pressing or sintering by:
   applying to a reinforcing medium a slurry of an aqueous alkali silicate and a powdered ceramic; and
   removing the moisture content by drying.

2. A ceramic composite in accordance with claim 1 wherein:
   said composite is compressed during drying.

3. A ceramic composite in accordance with claim 1 wherein:
   said composite is first air dried at room temperature and then slowly heated.

4. A ceramic composite in accordance with claim 1 wherein:
   said aqueous alkali silicate is from the group consisting of:
   potassium silicate, and
   sodium silicate;
   said powdered ceramic is from the group consisting of:
   finely divided amorphous silica,
   fused silica powder, and
   glass powder; and
   said reinforcing medium is from the group consisting of:
   graphite fibers,
   fused silica cloth, and
   aramid fiber cloth.

5. A process for preparing a composite ceramic without pressing or sintering comprising the steps of:
   applying to a reinforcing medium a slurry of an aqueous alkali silicate and a powdered ceramic; and
   removing the moisture content by drying.

6. A process in accordance with claim 5 wherein:
   said composite is compressed during drying.

7. A process in accordance with claim 5 wherein:
   said composite is first air dried at room temperature and then slowly heated.

8. A process in accordance with claim 5 wherein:
   said aqueous alkali silicate is from the group consisting of:
   potassim silicate, and
   sodium silicate;
   said powdered ceramic is from the group consisting of:
   finely divided amorphous silica,
   fused silica powder, and
   glass powder; and
   said reinforcing medium is from the group consisting of:
   graphite fibers,
   fused silica cloth, and
   aramid fiber cloth.

* * * * *